(12) United States Patent
Umino et al.

(10) Patent No.: US 12,404,115 B2
(45) Date of Patent: Sep. 2, 2025

(54) MEAT PROCESSING APPARATUS

(71) Applicant: MAYEKAWA MFG. CO., LTD., Tokyo (JP)

(72) Inventors: Tatsuya Umino, Tokyo (JP); Toshihide Takahashi, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 56 days.

(21) Appl. No.: 18/548,695

(22) PCT Filed: Mar. 31, 2022

(86) PCT No.: PCT/JP2022/016678
§ 371 (c)(1),
(2) Date: Sep. 1, 2023

(87) PCT Pub. No.: WO2022/230608
PCT Pub. Date: Nov. 3, 2022

(65) Prior Publication Data
US 2024/0067458 A1  Feb. 29, 2024

(30) Foreign Application Priority Data
Apr. 30, 2021  (JP) ................................. 2021-077176

(51) Int. Cl.
*B65G 43/08* (2006.01)
*A22C 17/00* (2006.01)
(Continued)

(52) U.S. Cl.
CPC .......... *B65G 43/08* (2013.01); *A22C 17/0093* (2013.01); *B65G 47/46* (2013.01); *B65G 47/647* (2013.01)

(58) Field of Classification Search
CPC ...... B65G 43/08; B65G 47/46; B65G 47/647; A22C 17/0093
(Continued)

(56) References Cited

U.S. PATENT DOCUMENTS 5,256,102 A    10/1993 Heiland et al.
6,082,191 A *   7/2000 Neiferd ................. G01M 17/02
                                                      73/146

(Continued)

FOREIGN PATENT DOCUMENTS

CN           1630610 A     6/2005
CN         205161727 U     4/2016
(Continued)

OTHER PUBLICATIONS

CN214252016 (Year: 2020).*
(Continued)

*Primary Examiner* — Gene O Crawford
*Assistant Examiner* — Lester Rushin, III
(74) *Attorney, Agent, or Firm* — ROSSI, KIMMS & McDOWELL LLP

(57) ABSTRACT

The meat processing apparatus includes a conveying line including a plurality of conveying units arranged in series, at least one processing station for processing the meat conveyed by the conveying line, and a controller for controlling the conveying units. The plurality of conveying units include: a first conveying unit having a first conveyor and a first sensor for detecting the meat placed on the first conveyor; and a second conveying unit located downstream of the first conveying unit, and having a second conveyor and a second sensor for detecting the meat placed on the second conveyor. The controller is configured to drive and control the first conveyor and the second conveyor based on a detection result of the second sensor.

13 Claims, 4 Drawing Sheets

(51) Int. Cl.
  *B65G 47/46* (2006.01)
  *B65G 47/64* (2006.01)
(58) Field of Classification Search
  USPC ........................................................ 198/358
  See application file for complete search history.

(56) References Cited

U.S. PATENT DOCUMENTS

| | | | |
|---|---|---|---|
| 8,820,534 | B2 | 9/2014 | Thorsson et al. |
| 9,233,799 | B1 * | 1/2016 | Mishra ................... B65G 43/08 |
| 11,358,804 | B1 * | 6/2022 | Dosch .................... B65G 45/16 |
| 12,041,943 | B2 * | 7/2024 | Flammann ............. B65G 15/14 |
| 2003/0150695 | A1 | 8/2003 | Cotter et al. |
| 2005/0056524 | A1 | 3/2005 | Cotter et al. |
| 2005/0191670 | A1 * | 9/2005 | Stylli ...................... B01L 9/523 435/7.1 |
| 2006/0272930 | A1 | 12/2006 | Cotter et al. |
| 2011/0017031 | A1 * | 1/2011 | Fourney .............. B65B 69/0033 198/339.1 |
| 2011/0054674 | A1 * | 3/2011 | Thorsson ............... A22C 18/00 700/230 |
| 2015/0216192 | A1 | 8/2015 | Jacobsen et al. |
| 2015/0296813 | A1 | 10/2015 | Gardarsson et al. |
| 2015/0375881 | A1 * | 12/2015 | De Vries ................ B65G 37/00 198/457.01 |

FOREIGN PATENT DOCUMENTS

| | | |
|---|---|---|
| CN | 112707142 A | 4/2021 |
| EP | 1932788 A1 | 6/2008 |
| EP | 2277382 A1 | 1/2011 |
| EP | 2931052 B1 | 10/2018 |
| JP | S60106577 A | 6/1985 |
| JP | H0728124 U | 5/1995 |
| JP | 2004000132 A | 1/2004 |
| JP | 2013193835 A | 9/2013 |
| JP | 2015524659 A | 8/2015 |
| WO | 2009139031 A1 | 11/2009 |

OTHER PUBLICATIONS

GB2182625 (Year: 1987).*
Extended European Search Report issued in European Appln. No. 22795524.2, mailed Jul. 2, 2024.
International Search Report issued in Intl. Appln. No. PCT/JP2022/016678, mailed Jun. 14, 2022. English translation provided.
Written Opinion issued in Intl. Appln. No. PCT/JP2022/016678, mailed Jun. 14, 2022.
English translation of Written Opinion issued in Intl. Appln. No. PCT/JP2022/016678, mailed Jun. 14, 2022, previously cited in IDS filed Sep. 1, 2023.
International Preliminary Report on Patentability issued in Intl. Appln. No. PCT/JP2022/016678, mailed Nov. 9, 2023.
Office Action issued in Japanese Appln. No. 2021-077176 mailed Jun. 3, 2025. English machine translation provided.
Office Action issued in Chinese Appln. No. 202280027487.5 mailed Jun. 16, 2025. English machine translation provided.

* cited by examiner

MEAT PROCESSING APPARATUS

TECHNICAL FIELD

The present disclosure relates to a meat processing apparatus.

BACKGROUND

Conventionally, a meat processing apparatus is known which automatically conveys and processes meat. For example, a meat processing apparatus disclosed in Patent Document 1 includes a plurality of conveyors for conveying meat (work). In Patent Document 1, a work conveyed by the conveyor is thrown into an incision making station.

CITATION LIST

Patent Literature

Patent Document 1: WO2009/139031A

SUMMARY

Technical Problem

It is preferable to improve flexibility in conveyance of meat by, for example, changing the conveyance of meat according to a conveyance status by a plurality of conveyors. However, Patent Document 1 does not disclose such a kind of configuration.

An object of the present disclosure is to provide a meat processing apparatus with improved flexibility in conveying meat.

Solution to Problem

A meat processing apparatus according to at least one embodiment of the present invention, includes: a conveying line including a plurality of conveying units arranged in series; at least one processing station for processing meat conveyed by the conveying line; and a controller for controlling the conveying units. The plurality of conveying units include: a first conveying unit having a first conveyor and a first sensor for detecting the meat placed on the first conveyor; and a second conveying unit located downstream of the first conveying unit, the second conveying unit having a second conveyor and a second sensor for detecting the meat placed on the second conveyor. The controller is configured to drive and control the first conveyor and the second conveyor based on a detection result of the second sensor.

Advantageous Effects

According to the present disclosure, it is possible to provide a meat processing apparatus with improved flexibility in conveying meat.

DETAILED DESCRIPTION

Figure 1:
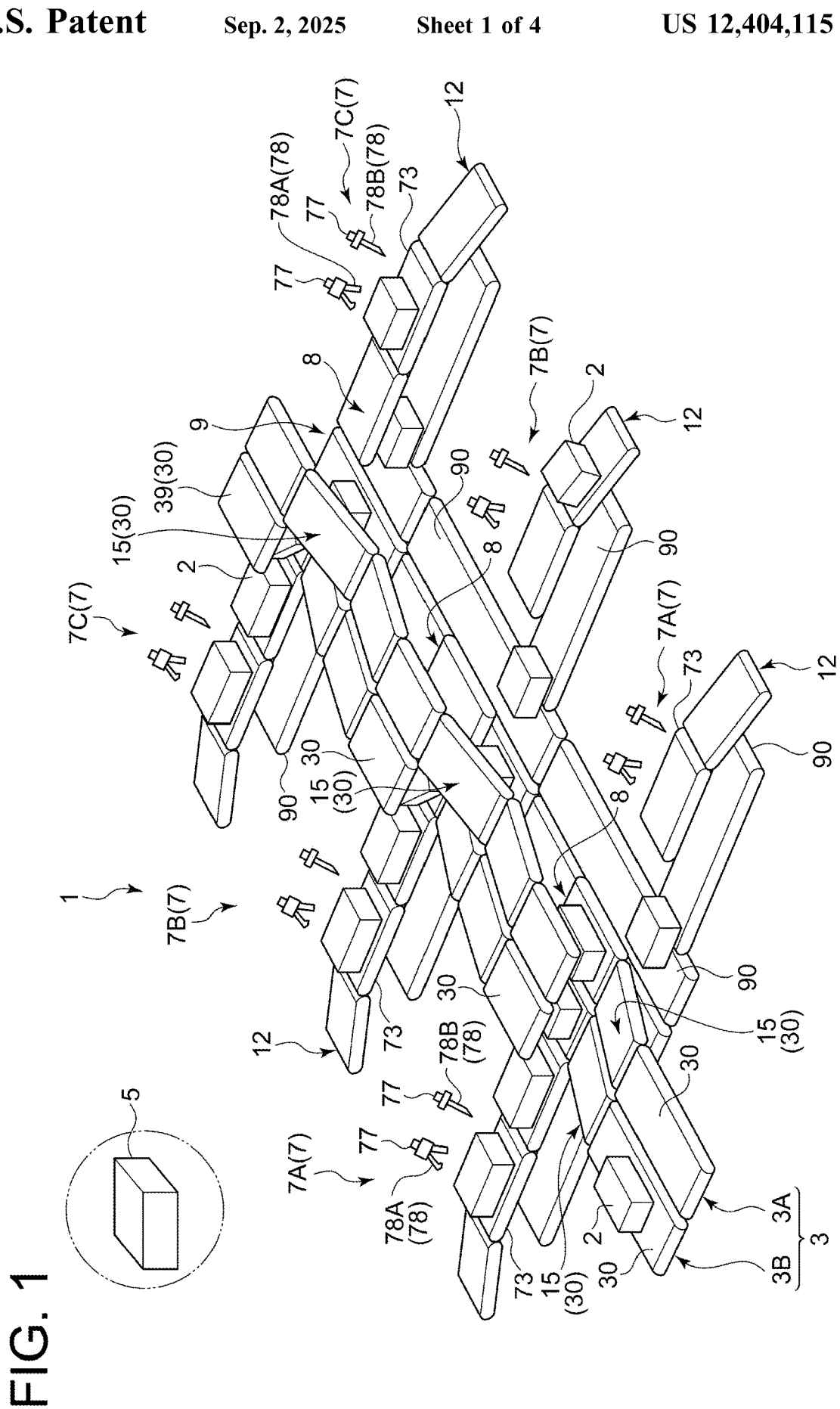
FIG. 1 is an overall perspective view conceptually showing a meat processing apparatus according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is an overall perspective view conceptually showing a meat processing apparatus 1 according to an embodiment.

The meat processing apparatus 1 is an apparatus for automatically conveying and processing meat 2. The meat 2 may be meat such as pork, beef, or horse, or may be meat such as fish or chicken. Further, the meat 2 may be meat with bones or meat without bones.

The meat processing apparatus 1 according to an embodiment includes a conveying line 3 including a plurality of conveying units 30 arranged in series, at least one processing station 7 for processing the meat 2 conveyed by the conveying line 3, and a controller 5 for controlling the conveying units 30.

Further, the meat processing apparatus 1 of the present example includes a supply unit 8 for supplying the meat 2 conveyed by the conveying line 3 to the processing station 7, a discharge line 9 that includes a plurality of discharge units 90 for conveying the meat 2 processed by the processing station 7, and a delivery unit 12 for passing the processed meat 2 from the processing station 7 to the discharge line 9.

Furthermore, the plurality of conveying units 30 described above include a sorting unit 15. The sorting unit 15 is configured to selectively switch a conveyance destination of the meat 2 to be conveyed to either the supply unit 8 or the conveying unit 30.

The controller 5 of the present example is configured to control the processing station 7, the supply unit 8, the discharge line 9, the sorting unit 15, and the delivery unit 12, in addition to the conveying unit 30. The controller 5 is one or a plurality of computing devices. A processor included in the computing device may be a CPU, a GPU, an MPU, a DSP, or a combination of these, or may be implemented by an integrated circuit such as a PLD, an ASIC, an FPGA, or an MCU. The computing device may include a memory such as a ROM, a RAM, or a flash memory, as appropriate.

The meat processing apparatus 1 according to another embodiment may not include at least one of the processing station 7, the supply unit 8, the discharge unit 90, the sorting unit 15, or the delivery unit 12.

The conveying line 3 of an embodiment includes a first conveying line 3A and a second conveying line 3B arranged in parallel with each other, and on these two conveying lines, independent conveyance control is performed by the controller 5.

On the first conveying line 3A and the second conveying line 3B, different types of meat 2 are selectively thrown into the first conveying line 3A or the second conveying line 3B. As a more specific example, if the meat 2 is a right leg or a left leg of pork, the first conveying line 3A and the second conveying line 3B are, respectively, a conveying line dedicated to the right leg of pork and a conveying line dedicated to the left leg of pork. In another embodiment, the same type of meat 2 may be conveyed by the first conveying line 3A or the second conveying line 3B, or a plurality of kinds of meat may be thrown into each of the first conveying line 3A and the second conveying line 3B.

The at least one processing station 7 in an embodiment includes a plurality of processing stations 7 arranged along the conveying line 3. In the present example, the processing stations 7 corresponding to the first conveying line 3A include a first processing station 7A, a second processing station 7B, and a third processing station 7C in order from an upstream side in a conveyance direction of the conveying line 3. Likewise, the second conveying line 3B also includes the first processing station 7A, the second processing station 7B, and the third processing station 7C in order from the upstream side. Hereinafter, the first processing station 7A, the second processing station 7B, and the third processing station 7C may collectively be referred to as the "processing station 7". The six processing stations 7 in the present example have the same configuration. In another example, the six processing stations 7 may have different configurations.

Each processing station 7 includes a station conveyor 73 for receiving the meat 2 from the supply unit 8, and a multi-axis robot 77 fitted with a tool 78 for meat processing. In the present example, a plurality of multi-axis robots 77 fitted with mutually different tools 78A, 78B (78) are provided, and the plurality of multi-axis robots 77 process the meat 2 placed on the station conveyor 73. The station conveyor 73 is, for example, a belt conveyor. Further, the number of multi-axis robots 77 may be one, or may be at least three.

In another embodiment, the conveying line 3 may not include the second conveying line 3B, and in this case, the number of processing stations 7 may be one. Alternatively, the conveying line 3 may further include another conveying line in addition to the first conveying line 3A and the second conveying line 3B.

Figure 2:
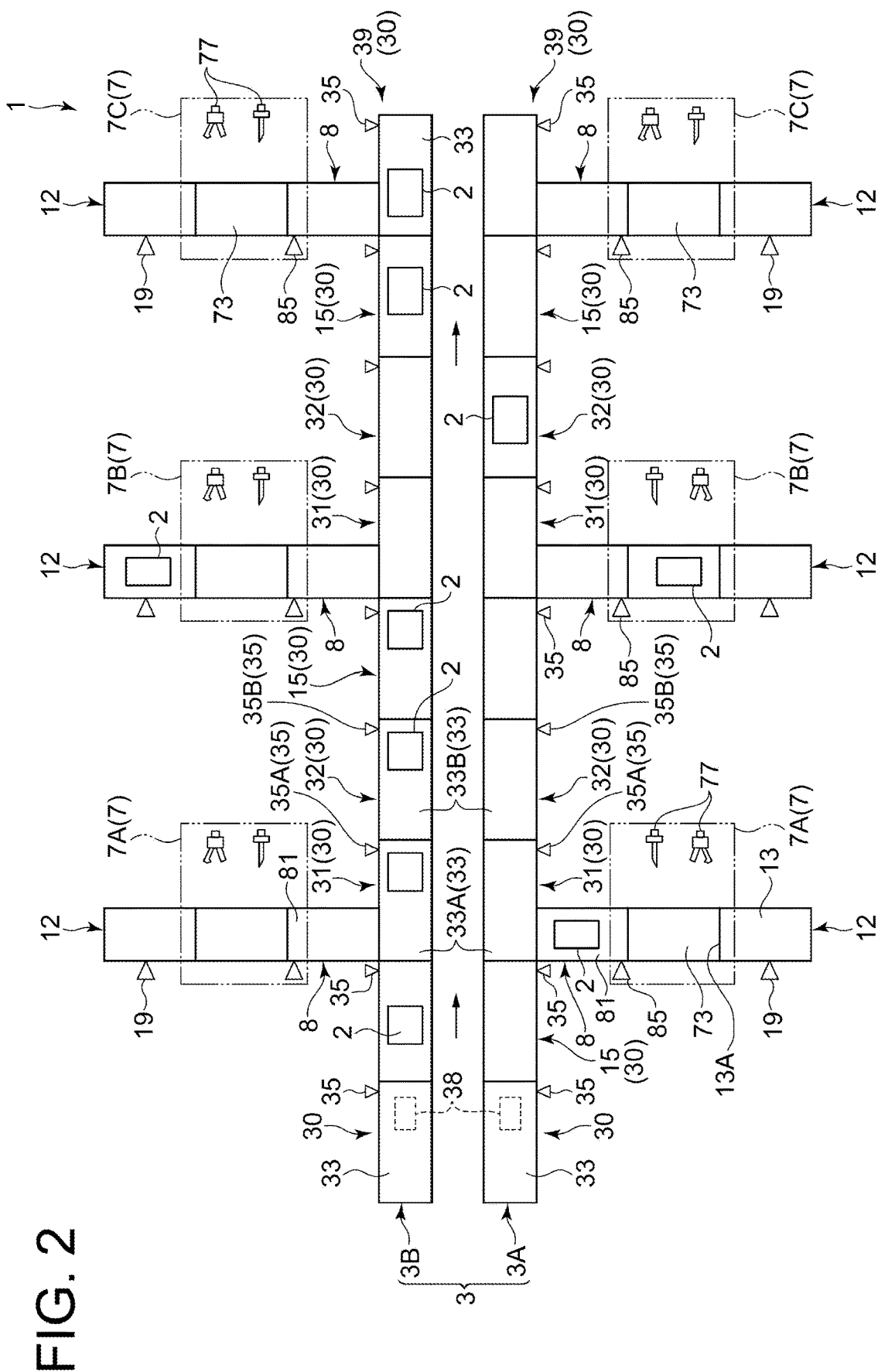
FIG. 2 is a plan view conceptually showing the meat processing apparatus according to an embodiment.

FIG. 2 is a plan view of the meat processing apparatus 1 according to an embodiment.

Each of the first conveying line 3A and the second conveying line 3B of an embodiment includes the plurality of conveying units 30. The first conveying line 3A and the second conveying line 3B have mutually symmetric configurations in plan view, and the plurality of conveying units 30 of the first conveying line 3A and the plurality of conveying units 30 of the second conveying line 3B also have mutually symmetric configurations. Hereinafter, the details will be described with a focus on the plurality of conveying units 30 that constitute the first conveying line 3A.

The conveying units 30 of the present example include a conveyor 33, sensors 35 for detecting the meat 2 placed on the conveyor 33, and a motor 38 configured to apply, to the conveyor 33, a driving force for conveying the meat 2. As an example, each conveying unit 30 further includes a base (not shown) for supporting the conveyor 33, the sensor 35, and the motor 38. In FIG. 2, only the two most upstream motors 38 are illustrated for the sake of illustrative convenience.

The conveyor 33 is, for example, a belt conveyor. The sensor 35 is, for example, a reflective or transmissive photoelectric sensor configured to emit light toward a conveying path for the meat 2. The sensor 35 of the present example is located downstream of a center position in the conveyance direction of the conveyor 33.

With the above configuration, each conveying unit 30 is equipped with the sensor 35 for detecting the meat 2 and the motor 38 serving as a power source for conveying the meat 2, reducing a restriction when the plurality of conveying units 30 are arranged. For example, the plurality of conveying units 30 can linearly be arranged as shown in FIG. 2, or in another example, can also be arranged in an arc shape, or arrangement that combines of these is also possible. Therefore, as a result of improving flexibility in designing the layout of the conveying line 3, flexibility in conveying the meat 2 is improved.

The plurality of conveying units 30 include a first conveying unit 31 and a second conveying unit 32 located downstream of the first conveying unit 31.

Hereinafter, the conveyor 33, the sensor 35, and the motor 38 of the first conveying unit 31 may respectively be referred to as a "first conveyor 33A", a "first sensor 35A", and a "first motor," and the conveyor 33, the sensor 35, and the motor 38 of the second conveying unit 32 may respectively be referred to as a "second conveyor 33B", a "second sensor 35B", and a "second motor".

The controller 5 is configured to drive and control the first conveyor 33A and the second conveyor 33B based on a detection result of the second sensor 35B.

For example, the controller 5 can perform conveyance control for avoiding collision of a plurality of meats 2 on the second conveyor 33B. More specifically, while driving and controlling the second motor, the controller 5 determines, based on the detection result of the second sensor 35B, whether the meat 2 is discharged from the second conveying unit 32. If it is determined that the meat 2 is not discharged, the controller 5 can perform, on the first motor, conveyance control to keep the subsequent meat 2 on standby in the first conveying unit 31.

Standby is a concept that includes stopping the meat 2 at a predetermined position and continuing conveyance of the meat 2 at a decreased conveying speed.

In another example, on the condition that the meat 2 is discharged from the second conveying unit 32, the controller 5 may start conveyance control of the first motor and the first conveying unit 31 may start receiving the meat 2 from the downstream side.

With the above configuration, since the meat 2 is conveyed from the first conveying unit 31 to the second conveying unit 32 according to the presence or absence of the meat 2 in the second conveying unit 32, it is possible to improve flexibility in conveying the meat 2.

The meat processing apparatus 1 may not include at least one of the processing station 7, the supply unit 8, the discharge unit 90, the sorting unit 15, or the delivery unit 12. Even in this case, since the meat 2 is conveyed from the first conveying unit 31 to the second conveying unit 32 according to the presence or absence of the meat 2 in the second conveying unit 32, it is possible to improve flexibility in conveying the meat 2. Further, the meat processing apparatus 1 may not include the second conveying line 3B. Even in this case, since the meat 2 is conveyed from the first conveying unit 31 to the second conveying unit 32 according to the presence or absence of the meat 2 in the second conveying unit 32, it is possible to improve flexibility in conveying the meat 2.

In an embodiment, the first conveying unit 31 and the second conveying unit 32 are adjacent to each other.

If the meat 2 is on each of the first conveyor 33A and the second conveyor 33B, the controller 5 (see FIG. 1) is configured to drive and control the first conveying unit 31 and the second conveying unit 32 such that the meat 2 on the first conveyor 33A stands by in the first conveying unit 31 until the meat 2 is discharged from the second conveyor 33B.

For example, if the meat 2 discharged from the first conveying unit 31 stays in the second conveying unit 32, the first sensor 35A switches from a detection state to a non-detection state, and the second sensor 35B switches from the non-detection state to the detection state. After the second motor stops driving with this state change of the second sensor 35B as a trigger, when the subsequent meat 2 is conveyed to the first conveying unit 31, the first sensor 35A switches to the detection state. At this time, the controller 5 can control the first motor to keep the subsequent meat 2 on standby in the first conveying unit 31.

With the above configuration, since the first conveying unit 31 and the second conveying unit 32 adjacent to each other are subjected to conveyance control, it is possible to narrow a conveyance interval of the plurality of meats 2. Thus, it is possible to improve flexibility in conveying the meat 2, while narrowing the conveyance interval of the plurality of meats 2.

In another embodiment, another conveying part may be interposed between the first conveying unit 31 and the second conveying unit 32. The another conveying part is, for example, a unit in which a plurality of belt conveyors arranged in series are driven by one motor.

In an embodiment, the first conveying unit 31 and the second conveying unit 32 are arranged between two processing stations 7 adjacent in the conveyance direction of the meat 2 among the plurality of processing stations 7. As a more specific example, two sets of the first conveying unit 31 and the second conveying unit 32 are prepared, one set is arranged between the first processing station 7A and the second processing station 7B, and the other set is arranged between the second processing station 7B and the third processing station 7C.

With the above configuration, for example, if the number of meats 2 conveyed toward the downstream processing station 7 (the second processing station 7B or the third processing station 7C) is excessive, the meat 2 can be kept on standby in at least either of the first conveying unit 31 or the second conveying unit 32. Whereby, it is possible to improve flexibility in conveying the meat 2 to the processing station 7.

The meat processing apparatus 1 according to another embodiment may not include at least one of the supply unit 8, the discharge unit 90, the sorting unit 15, or the delivery unit 12. Even in this case, for example, if the number of meats 2 conveyed toward the downstream processing station 7 (the second processing station 7B or the third processing station 7C) is excessive, the meat 2 can be kept on standby in at least either of the first conveying unit 31 or the second conveying unit 32. Further, the meat processing apparatus 1 may not include the second conveying line 3B. Alternatively, the processing station 7 may not include the third processing station 7C. Even in these embodiments, if the number of meats 2 conveyed toward the downstream second processing station 7B is excessive, the meat 2 can be kept on standby in at least either of the first conveying unit 31 or the second conveying unit 32.

The control by the controller 5 for keeping the meat 2 on standby in the first conveying unit 31 is as already described, and the meat 2 can be kept on standby in the second conveying unit 32 by similar control.

Further, in another embodiment, the first conveying unit 31 and the second conveying unit 32 may be arranged upstream of the first processing station 7A.

In an embodiment, the number (two in the present example) of plurality of conveying units 30 between the first processing station 7A and the second processing station 7B in the conveyance direction of the conveying line 3 is not less than the number (two in the present example) of at least one conveying unit 30 between the second processing station 7B and the third processing station 7C in the conveyance direction. The number of plurality of conveying units 30 between the first processing station 7A and the second processing station 7B may be at least three. The number of at least one conveying unit 30 between the second processing station 7B and the third processing station 7C may be at least three.

With the above configuration, the plurality of conveying units 30 between the first processing station 7A and the second processing station 7B convey more meats 2 than the at least one conveying unit 30 between the second processing station 7B and the third processing station 7C. By increasing the number of conveying units 30 arranged between the first processing station 7A and the second processing station 7B, it is possible to keep more meat 2 on standby in that section. Thus, it is possible to suppress retention of the meat 2 on the entire conveying line 3.

The meat processing apparatus 1 according to another embodiment may not include at least one of the supply unit 8, the discharge unit 90, the sorting unit 15, or the delivery unit 12. Further, the meat processing apparatus 1 may not include the second conveying line 3B. Also in these embodiments, by increasing the number of conveying units 30 arranged between the first processing station 7A and the second processing station 7B, it is possible to keep more meat 2 on standby in that section.

Further, in another embodiment, the number of conveying units 30 arranged between the first processing station 7A and the second processing station 7B may be greater than the number of conveying units 30 arranged between the second processing station 7B and the third processing station 7C. In this case, retention of the meat 2 on the entire conveying line 3 is further suppressed.

Figure 3:
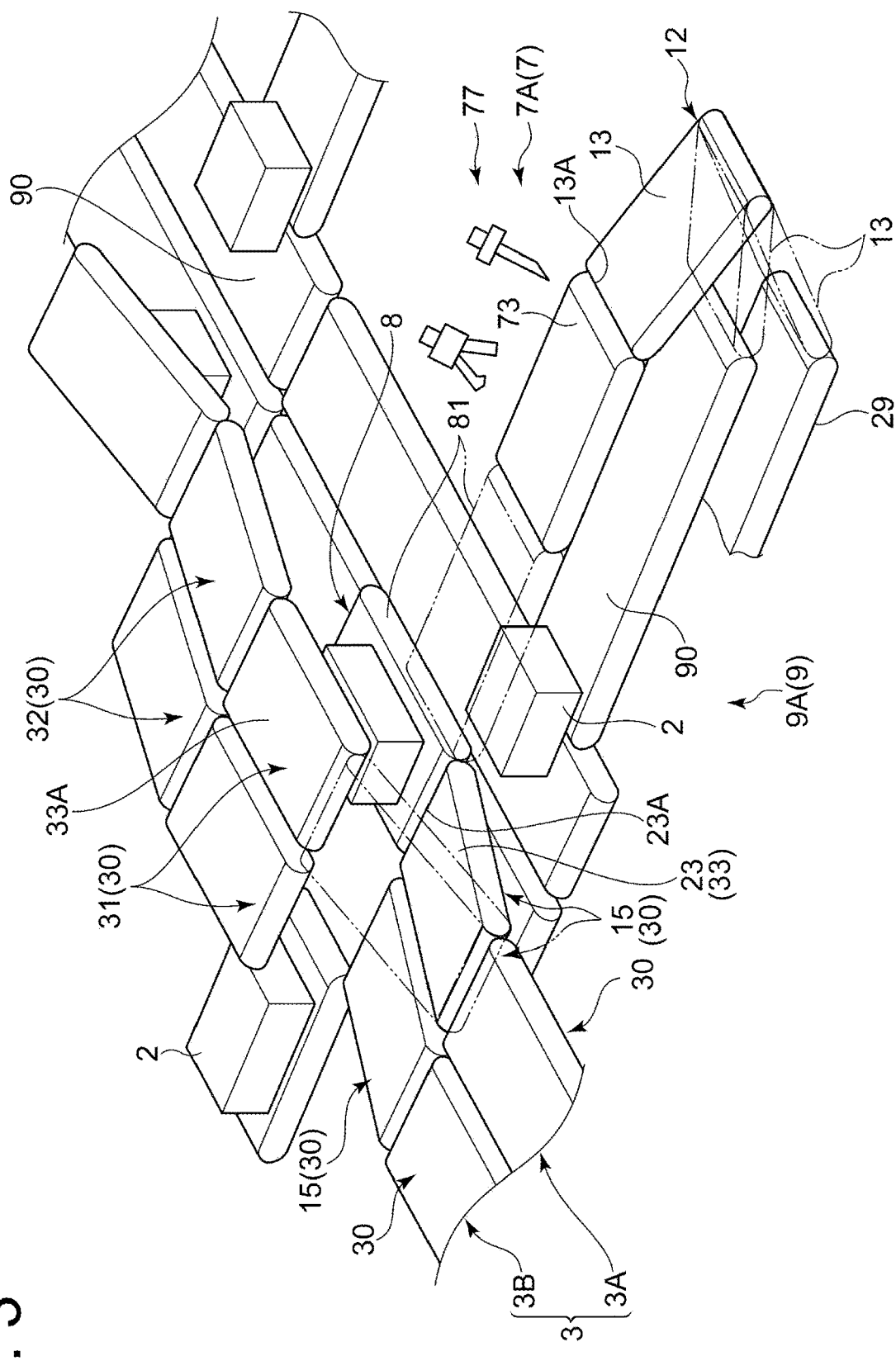
FIG. 3 is an enlarged perspective view conceptually showing a sorting unit, a supply unit, and a delivery unit according to an embodiment.

FIG. 3 is an enlarged perspective view conceptually showing the sorting unit 15, the supply unit 8, and the delivery unit 12 according to an embodiment.

Each of the first conveying line 3A and the second conveying line 3B according to an embodiment includes the supply unit 8 and the sorting unit 15 described already. Further, both the supply unit 8 and the sorting unit 15 are disposed corresponding to each of the first processing station 7A, the second processing station 7B, and the third processing station 7C. That is, in the present example, six supply units 8 and six sorting units 15 are provided.

In order to avoid duplication of description, the details will be described below with a focus on the supply unit 8 and the sorting unit 15 corresponding to the first processing station 7A of the first conveying line 3A.

The supply unit 8 of an embodiment is configured to supply the meat 2 exclusively to the first processing station 7A. The sorting unit 15, which is a constituent element of the plurality of conveying units 30, is configured to selectively convey the meat 2 to either the supply unit 8 or the first conveying unit 31.

The sorting unit 15 is a unit in which another component is further added to the conveying unit 30 described above. Specifically, the sorting unit 15 includes the conveyor 33, the sensor 35 (see FIG. 2), the motor 38 (see FIG. 2), and the base described already. The sorting unit 15 further includes, as additional components, an air cylinder for raising and lowering a downstream portion of the base, and a support for rotatably supporting the base. Hereinafter, the conveyor 33 of the sorting unit 15 will be referred to as a "sorting conveyor 23". The sorting conveyor 23 has a downstream end 23A for rising and lowering so as to be close to either the supply unit 8 or the first conveying unit 31. In the present example, raising and lowering the downstream end 23A are implemented by the air cylinder, but in another example, raising and lowering the downstream end 23A may be implemented by a hydraulic cylinder, a motor, or the like.

In FIG. 3, the sorting conveyor 23 with the downstream end 23A located downward is illustrated by a solid line, and the sorting conveyor 23 with the downstream end 23A located upward is illustrated by a double-dotted chain line. The sorting conveyor 23 conveys the meat 2 to the supply unit 8 when the downstream end 23A is located downward. On the other hand, the conveyor 33 conveys the meat 2 to the first conveying unit 31 when the downstream end 23A is located upward.

The sorting unit 15 operates as follows, for example. The motor 38 (see FIG. 2) is driven regardless of the conveyance destination of the meat 2, and if the conveyance destination of the meat 2 is the first conveying unit 31, the downstream end 23A of the sorting conveyor 23 is moved upward by driving the air cylinder. Whereby, the sorting conveyor 23 can pass the meat 2 conveyed from the upstream conveying unit 30 to the first conveying unit 31. The meat 2 may reach a detection area of the sensor 35 before the downstream end 23A completes the upward movement. In this case, the motor 38 may temporarily stop driving and resume driving after the movement of the downstream end 23A is completed. Next, if the conveyance destination of the meat 2 is the supply unit 8, the downstream end 23A moves downward while the meat 2 received from the upstream conveying unit 30 moves on the sorting conveyor 23. Whereby, the sorting conveyor 23 can convey the meat 2 toward the supply unit 8. If the meat 2 reaches the detection area of the sensor 35 before the downstream end 23A completes the downward movement, the same control as when the conveyance destination is the first conveying unit 31 is performed. Thus, since the meat 2 moves on the sorting conveyor 23 by driving the motor 38 even while the downstream end 23A of the sorting conveyor 23 is raised and lowered, it is possible to reduce a conveyance time of the meat 2 by the sorting conveyor 23.

The above operation is implemented by causing the controller 5 to drive and control the motor 38 and the air cylinder based on the detection result of the sensor 35. The above-described sensor 35 is at least either of the sensor 35 of the upstream conveying unit 30 or the sensor 35 of the sorting unit 15.

With the above configuration, since the conveyance destination of the meat 2 is switched simply by raising and lowering the downstream end 23A of the sorting conveyor 23, the meat processing apparatus 1 can simplify the configuration of the conveying line 3.

In another embodiment, the sorting unit 15 may not include the sensor 35. Further, the sorting unit 15 may not include the motor 38 (see FIG. 2) and in this case, the sorting conveyor 23 may be driven by the motor 38 of the upstream conveying unit 30.

In an embodiment, the supply unit 8 includes a supply conveyor 81 for conveying the meat 2, and a supply sensor 85 (see FIG. 2) for detecting the meat 2 placed on the supply conveyor 81. The supply conveyor 81 is, for example, a belt conveyor.

The supply unit 8 of the present example further includes a supply motor (not shown) for driving the supply conveyor 81. The supply conveyor 81, the supply sensor 85, and the supply motor are all supported by a base part. Further, the base part rotates horizontally (that is, rotates with the vertical direction as the axial direction) by obtaining power from a switching drive part (not shown). Both the base part and the switching drive part are constituent elements of the supply unit 8. As an example, the switching drive part is an air cylinder, a motor, or the like.

In the present example, the posture of the supply conveyor 81 is changed by rotating the base part horizontally by approximately 90 degrees as the switching drive part is driven. Specifically, the supply conveyor 81 is configured to change between a receiving posture for conveying the meat 2 in a direction parallel to the conveyance direction of the conveying line 3 in plan view and a supply posture for conveying the meat 2 in a direction away from the plurality of conveying units 30 in plan view. In FIG. 3, the supply conveyor 81 in the receiving posture is illustrated by a solid line, and the supply conveyor 81 in the supply posture is illustrated by a double-dotted chain line. The supply conveyor 81 in the receiving posture overlaps the first conveyor 33A in plan view, and at this time, an upstream end of the supply conveyor 81 is close to the downstream end 23A of the sorting conveyor 23. The supply conveyor 81 in the supply posture extends orthogonally to the first conveyor 33A in plan view, and at this time, the upstream end of the supply conveyor 81 is separated from the downstream end 23A of the sorting conveyor 23.

The supply unit 8 operates as follows, for example. The supply conveyor 81 in the receiving posture is driven by the power of the supply motor and receives the meat 2 from the sorting conveyor 23. When the supply motor stops driving, the meat 2 stops on the supply conveyor 81. Thereafter, the supply conveyor 81 is changed to the supply posture by driving the switching drive part. The meat 2 is conveyed from the supply conveyor 81 to the station conveyor 73 by resuming the driving of the supply motor.

The operation of the supply unit 8 described above is controlled by the controller 5. The control to stop the meat 2 on the supply conveyor 81 in the receiving posture may be performed, for example, based on the detection result of the sensor 35 (see FIG. 2) of the sorting unit 15, or may be performed based on the detection result of the supply sensor 85 (see FIG. 2). Further, if the subsequent meat 2 is conveyed to the sorting conveyor 23 when the meat 2 is on the supply conveyor 81, the controller 5 (see FIG. 1) may drive and control the sorting motor such that the subsequent meat 2 stands by on the sorting conveyor 23.

With the above configuration, since the supply conveyor 81 has both the function of receiving the meat 2 from the sorting conveyor 23 and the function of supplying the meat 2 to the first processing station 7A, it is possible to simplify the configuration of the supply unit 8.

Further, while the meat 2 stands by in the supply unit 8, the subsequent meat 2 stands by in the sorting unit 15. Whereby, it is possible to reduce a downtime of the first processing station 7A (processing station 7) when the meat 2 is sequentially processed. Thus, it is possible to improve productivity of the meat processing apparatus 1.

In an embodiment, the first processing station 7A (processing station 7) is configured to process the meat 2 conveyed from the supply unit 8 to the station conveyor 73.

The controller 5 (see FIG. 1) of an embodiment is configured to drive and control, based on data indicating a processing status of the first processing station 7A, the supply conveyor 81 (supply motor) such that the subsequent meat 2 stands by in the supply unit 8 if the meat 2 is in the processing station 7.

The data indicating the processing status is data indicating that the first processing station 7A is processing the meat 2, for example, data indicating that a meat processing program is being executed. As another example, the data indicating the processing status may be a photographed image acquired from a photographing device for photographing the meat 2 placed in the first processing station 7A. The photographed image changes depending on whether the meat 2 is on the station conveyor 73. The photographing device may be a visible light camera, or may be a combination of the visible light camera and a 3D camera. In still another example, the data indicating the processing status may be a detection result of a photoelectric sensor provided in the station conveyor 73.

With the above configuration, since the subsequent meat 2 stands by in the dedicated supply unit 8 during the processing in the first processing station 7A, it is possible to reduce the downtime of the first processing station 7A when the meat 2 is sequentially processed. Thus, it is possible to improve productivity of the meat processing apparatus 1.

Referring back to FIG. 2, an evacuation conveying unit 39 included in the conveying unit 30 will be described.

The evacuation conveying unit 39 of an embodiment is located downstream of the conveying path from the conveying unit 30 to the processing station 7 in the conveyance direction of the conveying line 3. In the present example, the evacuation conveying unit 39 is located downstream of any of the plurality of conveying paths respectively corresponding to the plurality of processing stations 7.

In the present example, two evacuation conveying units 39 are disposed corresponding to the first conveying unit 31 and the second conveying unit 32, respectively. Further, the evacuation conveying unit 39 of the present example is configured such that the meat 2 is conveyed from the sorting unit 15 located most downstream. When the downstream end 23A of the sorting conveyor 23 of the sorting unit 15 is located upward, the meat 2 is conveyed from the sorting conveyor 23 to the evacuation conveying unit 39.

For example, the controller 5 controls the conveying line 3 such that the meat 2 is conveyed to the evacuation conveying unit 39, if the meat 2 that may be unsuitable for processing in the processing station 7 is conveyed or if the amount of the meat 2 conveyed on the conveying line 3 is excessive.

The meat 2 conveyed to the evacuation conveying unit 39 may be taken out by an operator, or may be discharged by another dedicated conveying line. The another dedicated conveying line can be formed by adding the conveying unit 30.

With the above configuration, even if there is the meat 2 that may be unsuitable for processing in the processing station 7 or if the meat 2 exceeding a conveyance capacity of the conveying unit 30 is thrown into the meat processing apparatus 1, the meat processing apparatus 1 can operate properly.

The already-described delivery units 12 are respectively disposed corresponding to the plurality of processing stations 7 (that is, in the present example, the first processing station 7A, the second processing station 7B, and the third processing station 7C) arranged along the conveying line 3.

As already described, a delivery conveyor 13 is configured to pass the meat 2 received from the station conveyor 73 included in the processing station 7 to the discharge unit 90.

The delivery units 12 of an embodiment are disposed corresponding to the respective processing stations 7. In order to avoid duplication of description, the details will be described below with a focus on the delivery unit 12 corresponding to the first processing station 7A.

As shown in FIG. 2, 3, the delivery unit 12 of an embodiment includes the delivery conveyor 13 for conveying the meat 2, a delivery motor (not shown) for driving the delivery conveyor 13, and a delivery sensor 19 for detecting the meat 2 placed on the delivery conveyor 13.

The delivery conveyor 13 of the present example has one end 13A for rising and lowering so as to selectively be close to the station conveyor 73 or the discharge unit 90. The one end 13A is raised and lowered by the air cylinder as an example. The air cylinder is provided in a support for rotatably supporting the delivery conveyor 13, the delivery motor, and the delivery sensor 19. The delivery conveyor 13 is a belt conveyor.

The one end 13A of the delivery conveyor 13 is close to the station conveyor 73 when the one end 13A is at an upper position, and is close to the discharge unit 90 when the one end 13A is at a first lower position below the upper position. In the example of FIG. 3, the delivery conveyor 13 with the one end 13A being at the upper position is illustrated by a solid line, and the delivery conveyor 13 with the one end 13A being at the first lower position is illustrated by a double-dotted chain line.

The delivery unit 12 operates as follows, for example. The delivery conveyor 13 receives the meat 2 from the station conveyor 73 by driving the delivery motor with the one end 13A being at the upper position. The delivery motor stops driving, in response to the switching of the delivery sensor 19 to the detection state. After the one end 13A is lowered to the first lower position by driving the air cylinder, the delivery motor is driven in a reverse direction and the meat 2 is conveyed to the discharge unit 90.

The above-described operation is performed by controlling the delivery unit 12 with the controller 5.

With the above configuration, since the delivery conveyor 13 has both the function of receiving the meat 2 from the processing station 7 and the function of passing the meat 2 to the discharge unit 90, it is possible to simplify the configuration of the delivery unit 12.

In another embodiment, the one end 13A of the delivery conveyor 13 may be able to lower down to a second lower position which is lower than the first lower position. The delivery conveyor 13 with the one end 13A being at the second lower position is illustrated by a double-dotted chain line. The one end 13A at the second lower position is close to a disposal part 29. That is, the one end 13A may be raised and lowered so as to selectively be close to the station conveyor 73, the conveying unit 30, or the disposal part 29. The disposal part 29 is configured to convey or store an unnecessary part removed from the meat 2 by the processing in the first processing station 7A (processing station 7). When the meat 2 is bone-in meat, the unnecessary part is a removed bone. For example, when the bone is removed from the meat 2 by the first processing station 7A and the processed meat 2 is conveyed from the station conveyor 73 to the delivery conveyor 13, the removed bone may be held by the multi-axis robot 77. After the processed meat 2 is conveyed from the station conveyor 73 to the delivery unit 12, if the multi-axis robot 77 places the bone which is the unnecessary part on the station conveyor 73, the processed meat 2 and the unnecessary part can respectively be conveyed to the discharge line 9 and the disposal part 29. The disposal part 29 may be a belt conveyor for conveying the unnecessary part, or may be a box for storing the unnecessary part.

Figure 4:
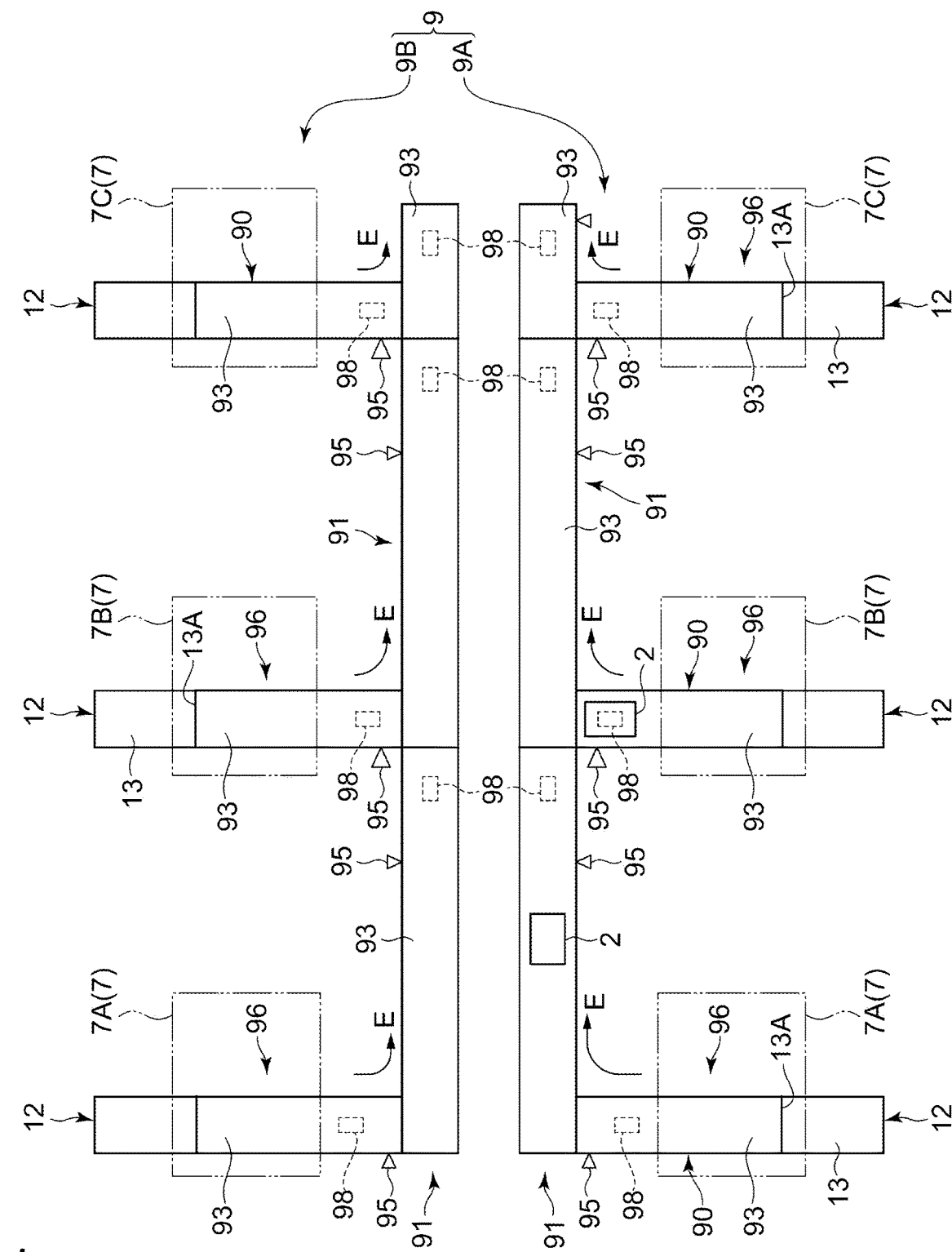
FIG. 4 is a plan view conceptually showing a discharge line according to an embodiment.

FIG. 4 is a plan view conceptually showing the discharge line 9 according to an embodiment.

The discharge line 9 of an embodiment includes a first discharge line 9A and a second discharge line 9B respectively corresponding to the first conveying line 3A and the second conveying line 3B described already. Each of the first discharge line 9A and the second discharge line 9B includes the plurality of already-described discharge units 90. The first discharge line 9A and the second discharge line 9B have mutually symmetric configurations in plan view, and the plurality of discharge units 90 of the first discharge line 9A and the plurality of discharge units 90 of the second discharge line 9B also have mutually symmetric configurations. Hereinafter, the details will be described with a focus on the plurality of discharge units 90 that constitute the first discharge line 9A.

Each of the discharge units 90 has the same configuration as the conveying unit 30 (see FIG. 2). That is, the discharge unit 90 includes a discharge conveyor 93 for conveying the meat 2, a discharge sensor 95 for detecting the meat 2 on the discharge conveyor 93, and a discharge motor 98 for applying, to the discharge conveyor 93, a driving force for conveying the meat 2.

The discharge conveyor 93 is, for example, a belt conveyor. The discharge sensor 95 is disposed downstream of a center position in a conveyance direction of the discharge conveyor 93.

The plurality of discharge units 90 include a plurality of series discharge units 91 arranged in series below the conveying lines 3 (see FIG. 2), and a plurality of parallel discharge units 96 extending parallel to each other so as to intersect the plurality of series discharge units 91.

The plurality of parallel discharge units 96 are disposed corresponding to the plurality of delivery units 12, respectively. Each parallel discharge unit 96 is configured to convey the processed meat 2 which is received from the one end 13A of the delivery conveyor 13 located at the first lower position to any of the series discharge units 91.

The plurality of series discharge units 91 are configured to convey the processed meat 2 conveyed from the parallel discharge units 96, respectively. The series discharge unit 91 of the present example is disposed on a vertically lower side of the supply conveyor 81 (see FIG. 3). Further, the series discharge unit 91 of the present example is disposed at a position overlapping the conveying line 3 and the supply conveyor 81 in the receiving posture in plan view (see FIG. 3). In plan view, the discharge conveyor 93 of the series discharge unit 91 extends parallel to the longitudinal direction of the conveyor 33 on the conveying line 3.

The discharge unit 90 operates as follows, for example. The meat 2 is conveyed from the parallel discharge unit 96 to the series discharge unit 91 by driving the discharge motor 98 of the parallel discharge unit 96 and the discharge motors 98 of the plurality of series discharge units 91. For example, while the series discharge unit 91 on the most upstream side in a discharge direction (arrow E) of the meat 2 conveys the meat 2, the parallel discharge unit 96 on the upstream side may be stopped after conveying the another meat 2 to be conveyed to a predetermined position. As a result, collision of the plurality of meats 2 at a junction of the parallel discharge unit 96 and the series discharge unit 91 is suppressed. The above-described controls are performed by the controller 5 independently of each other in the first discharge line 9A and the second discharge line 9B.

With the above configuration, the meat 2 conveyed by the plurality of parallel discharge units 96 is conveyed to any of the series discharge units 91. Since the processed meat 2 is collected to a specific line, it is possible to simplify the configuration for conveying the processed meat 2. In addition, since the plurality of series discharge units 91 are located below the plurality of conveying units 30, it is possible to reduce a space of the meat processing apparatus 1 in plan view.

(Conclusion)

Hereinafter, the overview of the meat processing apparatus (1) according to some embodiments will be described.

1) A meat processing apparatus (1) according to at least one embodiment of the present invention, includes: a conveying line (3) including a plurality of conveying units (30) arranged in series; at least one processing station (7) for processing meat (2) conveyed by the conveying line (3); and a controller (5) for controlling the conveying units (30). The plurality of conveying units (30) include: a first conveying unit (31) having a first conveyor (33A) and a first sensor (35A) for detecting the meat (2) placed on the first conveyor (33A); and a second conveying unit (32) located downstream of the first conveying unit (31), the second conveying unit (32) having a second conveyor (33B) and a second sensor (35B) for detecting the meat (2) placed on the second conveyor (33B). The controller (5) is configured to drive and control the first conveyor (33A) and the second conveyor (33B) based on a detection result of the second sensor (35B).

With the above configuration 1), since the meat (2) is conveyed from the first conveying unit (31) to the second conveying unit (32) according to the presence or absence of the meat (2) in the second conveying unit (32), it is possible to improve flexibility in conveying the meat (2). For example, the controller (5) can perform conveyance control for avoiding the plurality of meats (2) from staying on the second conveyor (33B). More specifically, on the condition that the meat (2) is discharged from the second conveying unit (32), the first conveying unit (31) can start receiving the meat (2). In another example, if the meat (2) is in the second conveying unit (32), the controller (5) can perform conveyance control to keep the subsequent meat (2) on standby in the first conveying unit (31).

2) In some embodiments, in the above configuration 1), the at least one processing station (7) includes a plurality of the processing stations (7) arranged along the conveying line (3), and the first conveying unit (31) and the second conveying unit (32) are arranged between the two processing stations (7) adjacent in a conveyance direction of the meat (2) among the plurality of processing stations (7).

With the above configuration 2), for example, if the number of meats (2) conveyed toward the downstream processing station (7) is excessive, the meat (2) can be kept on standby in at least either of the first conveying unit (31) or the second conveying unit (32). Therefore, it is possible to improve flexibility in conveying the meat (2) to the processing station (7).

3) In some embodiments, in the above configuration 2), the plurality of processing stations (7) include a first processing station (7A), a second processing station (7B), and a third processing station (7C) arranged in order from an upstream side in the conveyance direction of the conveying line (3), and the number of the plurality of conveying units (30) between the first processing station (7A) and the second processing station (7B) in the conveyance direction is not less than the number of the at least one conveying unit (30) between the second processing station (7B) and the third processing station (7C) in the conveyance direction.

With the above configuration 3), the plurality of conveying units (30) between the first processing station (7A) and the second processing station (7B) convey more meats (2) than the at least one conveying unit (30) between the second processing station (7B) and the third processing station (7C). By increasing the number of conveying units (30) arranged between the first processing station (7A) and the second processing station (7B), it is possible to keep more meat (2) on standby in that section. Thus, it is possible to suppress retention of the meat (2) on the entire conveying line (3).

4) In some embodiments, in the above configuration 2) or 3), the meat processing apparatus (1) further includes a supply unit (8) located below the first conveying unit (31) and configured to supply the meat (2) exclusively to any of the plurality of processing stations (7). The plurality of conveying units (30) include a sorting unit (15) configured to selectively convey the meat (2) to either the supply unit (8) or the first conveying unit (31). The sorting unit (15) includes a sorting conveyor (23) having a downstream end (23A) for rising and lowering so as to be close to either the supply unit (8) or the first conveying unit (31).

With the above configuration 4), since the conveyance destination of the meat (2) is switched simply by raising and lowering the downstream end (23A) of the sorting conveyor (23), the meat processing apparatus (1) can simplify the configuration of the conveying line (3).

5) In some embodiments, in the above configuration 4), the supply unit (8) includes a supply conveyor (81) configured to change between a receiving posture for conveying the meat (2) in a direction parallel to the conveyance direction in plan view and a supply posture for conveying the meat (2) in a direction away from the plurality of conveying units (30) in plan view.

With the above configuration 5), since the supply conveyor (81) has both the function of receiving the meat (2) from the sorting conveyor (23) and the function of supplying the meat (2) to the processing station (7), it is possible to simplify the configuration of the supply unit (8).

6) In some embodiments, in the above configuration 5), the supply unit (8) includes a supply sensor (85) for detecting the meat (2) placed on the supply conveyor (81), and the controller (5) is configured to drive and control, based on a detection result of the supply sensor (85), the sorting unit (15) such that the subsequent meat (2) stands by in the sorting unit (15) if the meat (2) is on the supply conveyor (81).

With the above configuration 6), while the meat (2) stands by in the supply unit (8), the subsequent meat (2) further stands by in the sorting unit (15). Whereby, it is possible to reduce a downtime of the processing station (7) when the meat (2) is sequentially processed. Thus, it is possible to improve productivity of the meat processing apparatus (1).

7) In some embodiments, in the above configuration 5) or 6), the controller (5) is configured to drive and control, based on data indicating a processing status of the processing station (7) where the meat (2) from the supply unit (8) is processed, the supply conveyor (81) such that the subsequent meat (2) stands by in the supply unit (8) if the meat (2) is in the processing station (7).

With the above configuration 7), since the subsequent meat (2) stands by in the supply unit (8) during the processing in the processing station (7), it is possible to reduce the downtime of the processing station (7) when the meat (2) is sequentially processed. Thus, it is possible to improve productivity of the meat processing apparatus (1).

8) In some embodiments, in any of the above configurations 1) to 7), the conveying units (30) include an evacuation conveying unit (39) located downstream of a conveying path from the conveying units (30) to the processing station (7) in a conveyance direction of the conveying line (3).

With the above configuration 8), some of the meats (2) can be evacuated to the evacuation conveying unit (39). Whereby, even if there is the meat (2) that may be unsuitable for processing in the processing station (7) or if the meat (2) conveyed by the conveying unit (30) is excessive, the meat processing apparatus (1) can operate properly.

9) In some embodiments, in any of the above configurations 1) to 8), the meat processing apparatus (1) further includes: a discharge line (9) including a plurality of discharge units (90) for conveying the meat (2) processed in the processing station (7); and a delivery unit (12) for passing the meat (2) received from a station conveyor (73) included in the processing station (7) to the discharge units (90). The delivery unit (12) includes a delivery conveyor (13) having one end 13A for rising and lowering so as to selectively be close to the station conveyor (73) or the discharge units (90).

With the above configuration 9), since the delivery conveyor (13) has both the function of receiving the meat (2) from the processing station (7) and the function of passing the meat (2) to the discharge unit (90), it is possible to simplify the configuration of the delivery unit (12).

10) In some embodiments, in the above configuration 9), a plurality of the delivery units (12) are, respectively, disposed corresponding to a plurality of the processing stations (7) arranged along the conveying line (3), and the plurality of discharge units (90) include: a plurality of series discharge units (91) arranged in series below the conveying line (3), the plurality of series discharge units (91) each including a discharge conveyor (93) and a discharge sensor (95) for detecting the meat (2) placed on the discharge conveyor (93); and a plurality of parallel discharge units (96) respectively disposed corresponding to a plurality of the delivery units (12), the plurality of parallel discharge units (96) extending parallel to each other so as to intersect the plurality of series discharge units (91), the plurality of parallel discharge units (96) each configured to convey the meat (2) received from a corresponding one of the plurality of delivery units (12) to any of the series discharge units (91).

With the above configuration 10), the meat (2) conveyed by the plurality of parallel discharge units (96) is conveyed to any of the series discharge units (91). Since the processed meat (2) is collected to a specific line, it is possible to simplify the configuration for conveying the processed meat (2). In addition, since the plurality of series discharge units (91) are located below the plurality of conveying units (30), it is possible to reduce a space of the meat processing apparatus (1) in plan view.

11) In some embodiments, in any of the above configurations 1) to 10), the first conveying unit (31) and the second conveying unit (32) are arranged at positions adjacent to each other, and if the meat (2) is on each of the first conveyor (33A) and the second conveyor (33B), the controller (5) is configured to drive and control the first conveying unit (31) and the second conveying unit (32) such that the meat (2) on the first conveyor (33A) stays in the first conveying unit (31) until the meat (2) is discharged from the second conveyor (33B).

With the above configuration 11), since the first conveying unit (31) and the second conveying unit (32) adjacent to each other are subjected to conveyance control, it is possible to narrow a conveyance interval of the plurality of meats (2).

Thus, it is possible to improve flexibility in conveying the meat (2), while narrowing the conveyance interval of the plurality of meats (2).

12) In some embodiments, in any of the above configurations 1) to 11), each of the plurality of conveying units (30) include: a conveyor (33); a sensor (35) for detecting the meat (2) placed on the conveyor, and a motor (38) configured to apply, to the conveyor, a driving force for conveying the meat (2).

With the above configuration 12), each conveying unit (30) is equipped with the sensor (35) for detecting the meat (2) and the motor (38) serving as a power source for conveying the meat (2), reducing a restriction when the plurality of conveying units (30) are arranged. Therefore, as a result of improving flexibility in designing the layout of the conveying line (3), flexibility in conveying the meat (2) is improved.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1: Meat processing apparatus
2: Meat
3: Conveying line
5: Controller
7: Processing station
8: Supply unit
9: Discharge line
12: Delivery unit
13: Delivery conveyor
13A: One end
15: Sorting unit
23: Sorting conveyor
23A: Downstream end
30: Conveying unit
31: First conveying unit
32: Second conveying unit
33: Conveyor
33A: First conveyor
33B: Second conveyor
35: Sensor
35A: First sensor
35B: Second sensor
38: Motor
39: Evacuation conveying unit
73: Station conveyor
81: Supply conveyor
85: Supply sensor
90: Discharge unit
91: Series discharge unit
93: Discharge conveyor
95: Discharge sensor
96: Parallel discharge unit

The invention claimed is:

1. A meat processing apparatus, comprising:
a conveying line including a plurality of conveying units arranged in series;
at least one processing station for processing meat conveyed by the conveying line; and
a controller for controlling the plurality of conveying units,
wherein the plurality of conveying units include:
a first conveying unit having a first conveyor and a first sensor for detecting a first meat placed on the first conveyor; and
a second conveying unit located downstream of the first conveying unit, the second conveying unit having a second conveyor and a second sensor for detecting a second meat placed on the second conveyor, and
wherein the controller is configured to drive and control the first conveyor and the second conveyor based on a detection result of the second sensor.

2. The meat processing apparatus according to claim 1,
wherein the at least one processing station includes a plurality of the processing stations arranged along the conveying line, and
wherein the first conveying unit and the second conveying unit are arranged between two processing stations, adjacent in a conveyance direction of the conveying line, among the plurality of processing stations.

3. The meat processing apparatus according to claim 2,
wherein the plurality of processing stations include a first processing station, a second processing station, and a third processing station arranged in order from an upstream side in the conveyance direction of the conveying line, and
wherein a number of conveying units between the first processing station and the second processing station in the conveyance direction is not less than a number of conveying units between the second processing station and the third processing station in the conveyance direction.

4. The meat processing apparatus according to claim 2, further comprising:
a supply unit located below the first conveying unit and configured to supply meat exclusively to any of the plurality of processing stations,
wherein the plurality of conveying units include a sorting unit configured to selectively convey meat to either the supply unit or the first conveying unit, and
wherein the sorting unit includes a sorting conveyor having a downstream end for rising and lowering so as to be close to either the supply unit or the first conveying unit.

5. The meat processing apparatus according to claim 4,
wherein the supply unit includes a supply conveyor configured to change between a receiving posture for conveying meat in a direction parallel to the conveyance direction in plan view and a supply posture for conveying meat in a direction away from the plurality of conveying units in plan view.

6. The meat processing apparatus according to claim 5, wherein the supply unit includes a supply sensor for detecting meat placed on the supply conveyor, and
wherein the controller is configured to drive and control, based on a detection result of the supply sensor, the sorting unit such that subsequent meat stands by in the sorting unit in a case where meat is detected on the supply conveyor.

7. The meat processing apparatus according to claim 5, wherein the controller is configured to drive and control, based on data indicating a processing status of the processing station where meat from the supply unit is processed, the supply conveyor such that subsequent meat stands by in the supply unit in a case where meat from the supply unit is in the processing station.

8. The meat processing apparatus according to claim 1, wherein the conveying units include an evacuation conveying unit located downstream of a conveying path from the conveying units to the processing station in a conveyance direction of the conveying line.

9. The meat processing apparatus according to claim 1, further comprising:
a discharge line including a plurality of discharge units for conveying meat processed in the processing station; and
a delivery unit for passing meat received from a station conveyor included in the processing station to the discharge units,
wherein the delivery unit includes a delivery conveyor having one end for rising and lowering so as to selectively be close to the station conveyor or the discharge units.

10. The meat processing apparatus according to claim 9, wherein a plurality of the delivery units are, respectively, disposed corresponding to a plurality of the processing stations arranged along the conveying line, and
wherein the plurality of discharge units include:
a plurality of series discharge units arranged in series below the conveying line, the plurality of series discharge units each including a discharge conveyor and a discharge sensor for detecting meat placed on the discharge conveyor; and
a plurality of parallel discharge units respectively disposed corresponding to a plurality of the delivery units, the plurality of parallel discharge units extending parallel to each other so as to intersect the plurality of series discharge units, the plurality of parallel discharge units each configured to convey meat received from a corresponding one of the plurality of delivery units to any of the series discharge units.

11. A meat processing apparatus, comprising:
a conveying line including a plurality of conveying units arranged in series;
at least one processing station for processing meat conveyed by the conveying line; and
a controller for controlling the plurality of conveying units,
wherein the plurality of conveying units include:
a first conveying unit having a first conveyor and a first sensor for detecting a first meat placed on the first conveyor; and
a second conveying unit located downstream of the first conveying unit, the second conveying unit having a second conveyor and a second sensor for detecting a second meat placed on the second conveyor, and
wherein the controller is configured to drive and control the first conveyor and the second conveyor based on a detection result of the second sensor,
wherein the first conveying unit and the second conveying unit are arranged at positions adjacent to each other, and
wherein, in a case where the first meat is on the first conveyor and the second meat is on the second conveyor, the controller is configured to drive and control the first conveying unit and the second conveying unit such that the first meat on the first conveyor stays in the first conveying unit until the second meat is discharged from the second conveyor.

12. The meat processing apparatus according to claim 1, wherein each of the plurality of conveying units include:
a conveyor;
a sensor for detecting meat placed on the conveyor, and
a motor configured to apply, to the conveyor, a driving force for conveying meat placed on the conveyor.

13. A meat processing apparatus, comprising:
a conveying line including a plurality of conveying units arranged in series;
at least one processing station for processing meat conveyed by the conveying line; and
a controller for controlling the plurality of conveying units,
wherein the plurality of conveying units include:
a first conveying unit having a first conveyor and a first sensor for detecting a first meat placed on the first conveyor; and
a second conveying unit located downstream of the first conveying unit, the second conveying unit having a second conveyor and a second sensor for detecting a second meat placed on the second conveyor, and
wherein the controller is configured to drive and control the first conveyor and the second conveyor based on a detection result of the second sensor such that the first meat is conveyed from the first conveying unit to the second conveying unit according to presence or absence of the second meat in the second conveying unit so as to avoid collision of the first meat with the second meat on the second conveyor.

* * * * *